United States Patent
Yerli

(10) Patent No.: US 12,374,028 B2
(45) Date of Patent: *Jul. 29, 2025

(54) 3D STRUCTURE ENGINE-BASED COMPUTATION PLATFORM

(71) Applicant: THE CALANY HOLDINGS S. À R.L., Luxembourg (LU)

(72) Inventor: Cevat Yerli, Dubai (AE)

(73) Assignee: THE CALANY HOLDINGS S. À R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,552

(22) Filed: Oct. 6, 2023

(65) Prior Publication Data

US 2024/0037844 A1 Feb. 1, 2024

Related U.S. Application Data

(63) Continuation of application No. 16/904,371, filed on Jun. 17, 2020, now Pat. No. 12,033,271.
(Continued)

(51) Int. Cl.
*G06T 15/20* (2011.01)
*G06T 7/536* (2017.01)
(Continued)

(52) U.S. Cl.
CPC ............ *G06T 15/205* (2013.01); *G06T 7/536* (2017.01); *G06T 15/005* (2013.01); *G06T 15/08* (2013.01); *G06T 17/10* (2013.01); *G06T 2215/16* (2013.01)

(58) Field of Classification Search
None
See application file for complete search history.

(56) References Cited

U.S. PATENT DOCUMENTS

| 7,451,196 B1 | 11/2008 | de Vries et al. |
| 9,072,972 B2 | 7/2015 | Ahiska et al. |

(Continued)

FOREIGN PATENT DOCUMENTS

| AU | 2014201887 A1 | 5/2014 |
| CA | 2881354 A1 | 10/2013 |

(Continued)

OTHER PUBLICATIONS

Cohen, B., et al., "Cloud Edge Computing: Beyond the Data Center," Berlin Summit at OpenStack, Oct. 2, 2018, <https://www.openstack.org/edge-computing/cloud-edge-computing-beyond-the-data-center/> [retrieved Jun. 11, 2019], 22 pages.

(Continued)

*Primary Examiner* — Andrew G Yang
(74) *Attorney, Agent, or Firm* — BRYAN CAVE LEIGHTON PAISNER LLP

(57) ABSTRACT

A system and method enabling per-user-optimized computing, rendering, and provisioning within virtual worlds. The system comprises a server including memory and at least one processor, the memory storing a persistent virtual world system comprising a data structure in which at least one virtual replica of at least one corresponding real object is represented, and a computing optimization platform configured to store and provide rules for optimizing the computing, rendering and data provisioning to users via user devices. A plurality of connected devices connected to the server via a network provide multi-source data, user input, or combinations thereof, to the persistent virtual world system, updating the virtual replicas. The server retrieves user location, viewing position and orientation from the one or more user devices to determine a user interaction radius, thereby optimizing via the computing optimization platform the
(Continued)

relevant computing, rendering and provisioning for the one or more user devices.

20 Claims, 10 Drawing Sheets

Related U.S. Application Data

(60) Provisional application No. 62/863,124, filed on Jun. 18, 2019.

(51) Int. Cl.
  *G06T 15/00* (2011.01)
  *G06T 15/08* (2011.01)
  *G06T 17/10* (2006.01)

(56) References Cited

U.S. PATENT DOCUMENTS

| | | |
|---|---|---|
| 9,111,326 B1 | 8/2015 | Worley, III et al. |
| 9,160,680 B1 | 10/2015 | Skvortsov et al. |
| 11,032,164 B1 | 6/2021 | Rothschild et al. |
| 11,304,771 B2 | 4/2022 | Panescu et al. |
| 11,307,968 B2 | 4/2022 | Yerli |
| 11,310,467 B2 | 4/2022 | Allen et al. |
| 2006/0122917 A1 | 6/2006 | Lokuge et al. |
| 2006/0184886 A1 | 8/2006 | Chung et al. |
| 2010/0113159 A1 | 5/2010 | Chapman et al. |
| 2010/0287529 A1 | 11/2010 | Costa et al. |
| 2010/0299618 A1* | 11/2010 | Pare ............ G06N 3/006 715/757 |
| 2011/0224811 A1 | 9/2011 | Lauwers et al. |
| 2011/0295719 A1 | 12/2011 | Chen et al. |
| 2011/0320520 A1 | 12/2011 | Jain |
| 2012/0149349 A1 | 6/2012 | Quade |
| 2012/0190458 A1 | 7/2012 | Gerson et al. |
| 2012/0281706 A1 | 11/2012 | Agarwal et al. |
| 2012/0281708 A1 | 11/2012 | Chauhan et al. |
| 2013/0044106 A1 | 2/2013 | Shuster et al. |
| 2013/0117377 A1 | 5/2013 | Miller |
| 2013/0219014 A1 | 8/2013 | Yerli |
| 2013/0222385 A1 | 8/2013 | Dorsey et al. |
| 2014/0063004 A1 | 3/2014 | Hamilton et al. |
| 2014/0156846 A1 | 6/2014 | Stern et al. |
| 2014/0176574 A1 | 6/2014 | Bakalash |
| 2014/0185616 A1 | 7/2014 | Bloch et al. |
| 2014/0229944 A1 | 8/2014 | Wang et al. |
| 2014/0282535 A1 | 9/2014 | Sato |
| 2015/0120931 A1 | 4/2015 | Padala et al. |
| 2015/0237667 A1 | 8/2015 | Ghai et al. |
| 2015/0296030 A1 | 10/2015 | Maes et al. |
| 2015/0310497 A1 | 10/2015 | Valin et al. |
| 2015/0341223 A1 | 11/2015 | Shen et al. |
| 2015/0348327 A1 | 12/2015 | Zalewski |
| 2016/0011896 A1 | 1/2016 | Khalid |
| 2016/0142337 A1 | 5/2016 | Skvortsov et al. |
| 2016/0154676 A1 | 6/2016 | Wen et al. |
| 2016/0197835 A1 | 7/2016 | Luft |
| 2016/0198003 A1 | 7/2016 | Luft |
| 2016/0293133 A1 | 10/2016 | Dutt |
| 2016/0361658 A1 | 12/2016 | Osman et al. |
| 2017/0048308 A1 | 2/2017 | Qaisar |
| 2017/0054792 A1 | 2/2017 | Christopher, II et al. |
| 2017/0094018 A1 | 3/2017 | Ekstrom et al. |
| 2017/0109187 A1 | 4/2017 | Cropper et al. |
| 2017/0155672 A1 | 6/2017 | Muthukrishnan et al. |
| 2017/0287496 A1 | 10/2017 | Heitkamp et al. |
| 2017/0308696 A1 | 10/2017 | Patel et al. |
| 2017/0366472 A1 | 12/2017 | Byers et al. |
| 2018/0024537 A1 | 1/2018 | Chauvet et al. |
| 2018/0025299 A1* | 1/2018 | Kumar ............ G02B 6/4292 |
| 2018/0060948 A1 | 3/2018 | Mattingly et al. |
| 2018/0093186 A1 | 4/2018 | Black et al. |
| 2018/0109282 A1 | 4/2018 | Khan et al. |
| 2018/0159745 A1 | 6/2018 | Byers et al. |
| 2018/0190017 A1 | 7/2018 | Mendez et al. |
| 2018/0205619 A1 | 7/2018 | Rios et al. |
| 2018/0225875 A1 | 8/2018 | Yasrebi |
| 2018/0285767 A1 | 10/2018 | Chew |
| 2018/0332132 A1 | 11/2018 | Sampath et al. |
| 2018/0336727 A1 | 11/2018 | Bastian et al. |
| 2019/0121960 A1 | 4/2019 | Brown et al. |
| 2019/0130631 A1 | 5/2019 | Gebbie et al. |
| 2019/0158569 A1 | 5/2019 | Singleton, IV et al. |
| 2019/0173773 A1 | 6/2019 | Baughman et al. |
| 2019/0215381 A1 | 6/2019 | Mukund et al. |
| 2019/0206129 A1 | 7/2019 | Khalid |
| 2019/0321725 A1 | 10/2019 | Zimring et al. |
| 2019/0362312 A1 | 11/2019 | Platt et al. |
| 2020/0143583 A1 | 5/2020 | Jiang et al. |
| 2020/0159421 A1 | 5/2020 | Karumbunathan et al. |
| 2020/0186445 A1 | 6/2020 | Govindaraju et al. |
| 2020/0245160 A1 | 7/2020 | Chu et al. |

FOREIGN PATENT DOCUMENTS

| | | | |
|---|---|---|---|
| CA | 2899263 | A1 | 8/2014 |
| CA | 3100815 | A1 | 9/2019 |
| CA | 3097146 | A1 | 10/2019 |
| CA | 3046247 | A1 | 12/2019 |
| CA | 3000643 | C | 4/2020 |
| CN | 109634720 | A | 4/2019 |
| CN | 107148620 | B | 2/2021 |
| CN | 107454128 | B | 5/2021 |
| EP | 3 333 706 | A1 | 6/2018 |
| JP | H1145348 | A | 2/1999 |
| JP | H11154048 | A | 6/1999 |
| JP | 2002269588 | A | 9/2002 |
| JP | 2003271985 | A | 9/2003 |
| JP | 2004348702 | A | 12/2004 |
| JP | 2006031358 | A | 2/2006 |
| JP | 2007156796 | A | 6/2007 |
| JP | 2009187115 | A | 8/2009 |
| JP | 2010131409 | A | 6/2010 |
| JP | 2015087892 | A | 5/2015 |
| JP | 2018032112 | A | 3/2018 |
| JP | 2018136664 | A | 8/2018 |
| WO | 2007069724 | A1 | 6/2007 |
| WO | 2009/029559 | A1 | 3/2009 |
| WO | 2015/123849 | A1 | 8/2015 |
| WO | 2016/164178 | A1 | 10/2016 |
| WO | 2017/064560 | A1 | 4/2017 |
| WO | 2017/064560 | A8 | 4/2017 |
| WO | 2019/079826 | A1 | 4/2019 |

OTHER PUBLICATIONS

Kaul, A., et al., "Using Virtualization for Distributed Computing," International Journal of Advances in Electronics and Computer Science 2(7):37-39, Jul. 2015.

Mital, Z., "Distributed Message Exchange System Modelling," in A. Sydow et al. (eds.), "Systems Analysis and Simulation," 1988, pp. 196-197, Akademie-Verlag Berlin.

Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube.com/watch?v=CVmfP8 TaqNU [retrieved on Oct. 30, 2020].

Extended European Search Report mailed Nov. 24, 2020, issued in European Application No. 20180853.2, 12 pages.

Extended European Search Report mailed Dec. 1, 2020, issued in European Application No. 20180906.8, 10 pages.

Hong, C., et al., "Resource Management in Fog/Edge Computing: A Survey," ACM Computing Surveys, 97: 1-22, Sep. 2019.

Atzori, L., et al., "SDN&NFV Contribution to IoT Objects Virtualization," Computer Networks, 149: 200-212, Feb. 2019.

Nastic, S., et al., "A Middleware Infrastructure for Utility-based Provisioning of IoT Cloud Systems," 2016 IEEE/ACM Symposium on Edge Computing (SEC), Washington D.C., Oct. 27-28, 2016, IEEE Computer Society, pp. 28-40.

(56) References Cited

OTHER PUBLICATIONS

Bruschi, R., et al., "Personal Services Placement and Low-Latency Migration in Edge Computing Environments," 2018 IEEE Conference on Network Function Virtualization and Software Defined Networks (NFV-SDN): 5GNetApp—5G-ready Network Applications, Services Development and Orchestration over Application-aware Network Slices @IEEE NFV-SDN 2018, Verona, Italy, Nov. 27-29, 2018, IEEE, 6 pages.

Extended European Search Report mailed Nov. 18, 2020, issued in European Application No. 20180891.2, 14 pages.

Office Action mailed May 3, 2021 issued in U.S. Appl. No. 16/904,130, filed Jun. 17, 2020, 35 pages.

Office Action mailed Nov. 9, 2021 issued in U.S. Appl. No. 16/904,130, filed Jun. 17, 2020, 29 pages.

Non Final Office Action mailed Feb. 22, 2022, issued in U.S. Appl. No. 16/904,441, filed Jun. 17, 2020, 34 pages.

Non Final Office Action mailed Apr. 28, 2022, issued in U.S. Appl. No. 16/904,130, filed Jun. 17, 2020, 24 pages.

Final Office Action mailed Oct. 7, 2022, issued in U.S. Appl. No. 16/904,441, filed Jun. 17, 2020, 30 pages.

Final Office Action mailed Jan. 17, 2023, issued in U.S. Appl. No. 16/904,130, filed Jun. 17, 2020, 23 pages.

Search Report by Registered Search Organization dated Feb. 22, 2024.

Tanaka et al. "A Case Study on Linux Grid using Virtual Machine," Information Processing Society of Japan Technical Report, vol. Nov. 2, 20076, 2007, pp. 91-96.

Ali et al. "All allocation management algorithm for DVE system," Computer Engineering & Systems, International Conference, Dec. 2009, p. 489-494.

Bouras et al. "Performance improvement of Distributed Virtual Environments by exploiting objects' atributes," Virtual Reality, DPRINGER-VERLAG, vol. 16, No. Aug. 2011.

\* cited by examiner

3D STRUCTURE ENGINE-BASED COMPUTATION PLATFORM

CROSS-REFERENCE TO RELATED APPLICATION

This application is a Continuation application of U.S. patent application Ser. No. 16/904,371, filed on Jun. 17, 2020, now allowed, which claims the benefit of Provisional Application No. 62/863,124, filed Jun. 18, 2019, the entire disclosure of which is hereby incorporated by reference herein for all purposes.

FIELD

The present disclosure generally relates to computer systems, and more specifically to computing, rendering, and provisioning of data of virtual worlds.

BACKGROUND

Current technological trends include the development of digital reality, which collectively includes augmented, virtual, and mixed reality technologies. The impact of these technologies may be considered a breakthrough that will revolutionize the entertainment, learning, financial, medical, mechanical, and other industries. Digital reality applications are developed via 3D engines, which offer an environment created specially to implement the functionalities that are specific for these applications.

As the world computing needs increase, especially given the trends to develop digital reality applications, conventional systems and methods used for implementing the digital realities are typically unable to scale to support the rendering and simulation of very large numbers of objects in real-time, as the computing resource requirements are relatively high. In this sense, consumers of these simulation systems have had to choose between correctness, graphical fidelity, and real-time-interaction, with no solution offering the ability for all three on a large scale system. The magnitude and complexity of the situation is further increased if the consumer desires to simulate complex real-world problems which may require more computing power than a single simulation engine can provide. For example, a simulation of a city may require simulation of a large number of vehicles, pedestrians, bicyclists, traffic patterns, traffic lights, subway systems, transit vehicles, airplanes, and a multitude of other entities that affect and contribute to city life.

In one approach, computing resources are statically assigned to a portion of the simulated world. A disadvantage of such approach may be that the different entities may accumulate on a small region of the simulated world, or that a number of objects may be located on the small region, resulting in high computing requirements that may overload the computing resources. This flat prioritization based on assigning computer resources by real or virtual world regions results in simulations that do not accurately provide experiences comparable to those of the real world.

Therefore, what is required is a system and method that can provide high-fidelity digital reality experiences including highly optimized computing resource provisioning to clients.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more drawbacks disclosed in the background or other technical problems are addressed through systems and methods enabling a per-user-optimized computing, rendering, and provisioning of data. The systems and methods use a computing optimization platform to optimize computing resources to be provisioned to user devices. The computing optimization platform is implemented in a system that utilizes 3D data structures of virtual replicas in a persistent virtual world system based on corresponding real world objects. Utilizing the 3D data structure of real world elements modeled or scanned and input into a persistent virtual world system can facilitate the filtering and optimization of data to be provisioned to user. This results in a realistic and more efficient rendering of images that takes into account aspects such as occlusion culling of virtual objects when hidden by real world objects; collisions between the virtual objects and real world objects; lighting effects; level of detail; and other effects, enabling a more natural feel and experience of interactions between users, the persistent virtual world system, and applications or other virtual objects therein, while optimizing computations. For example, if an ad or an application is hidden behind a real world object such as a tree or a building, a user may hear but not view, via a user device, the ad or application, and only the necessary rendering and computations along with network data provisioning are provided to the user. Providing a realistic feel of such a digital reality may be useful in the management of Internet of Things (IoT), efficient network data and bandwidth provisioning, resource optimization, artificial intelligence (AI), and other aspects that can be used in a plurality of fields.

A system of the current disclosure enabling a per-user-optimized computing, rendering, and provisioning within virtual worlds comprises a server system comprising one or more server computers, the one or more server computers comprising memory and at least one processor, the server system storing a persistent virtual world system comprising a data structure in which at least one virtual replica of at least one corresponding real object is represented. The server system further stores a computing optimization platform configured to store and provide rules for optimizing the computing, rendering and data provisioning to users via one or more user devices. In an embodiment, the system further comprises a plurality of connected devices connected to the server via a network and one or more user devices or other devices, the connected devices being configured to capture multi-source data, user input, or combinations thereof, which may serve to update the virtual replicas. When users physically or virtually access the persistent virtual world system, the server retrieves the user location, viewing position and orientation from the one or more user devices to determine a user interaction radius, thereby optimizing via the computing optimization platform the relevant computing, rendering and provisioning for the one or more user devices, wherein the optimizations are performed on a user interaction radius basis.

In some embodiments, the server system further stores a replica editor configured to model and edit the one or more virtual replicas; data from the real world captured by sensing mechanisms on the one or more connected devices; applications that can be positioned within the persistent virtual world system and which can be engaged by users; and an operating system configured to manage computer hardware and software resources for performing per-user-optimized computing, rendering and provisioning.

In some embodiments, optimizations performed by the computing optimization platform are performed on application data of applications positioned in the persistent virtual world system based on interactions with users, virtual replicas, other applications or virtual objects of the persistent virtual world system. The applications may be virtually attached to specific virtual replicas, or may be configured in locations of the persistent virtual world system not attached to any specific virtual replica.

In some embodiments, the system further comprises one or more fog servers comprising memory and at least one processor. The fog servers may be located in areas proximate to connected devices and may be configured to assist the servers and connected devices in the processing of the persistent virtual world system.

In some aspects of the current disclosure, the system further comprises a virtual layer abstracting functions between connected devices, servers and fog servers, the virtual layer further comprising a distribution platform configured to persistently distribute the relevant computing, rendering and provisioning across edge and cloud based on the computing optimization platform. In an embodiment, "edge" refers to the edge of an administrative domain, e.g., as close as possible to client devices of end users. In some cases, the edge of the domain may include the client devices themselves. In such cases, the phrase "across edge and cloud" may be used to refer to an arrangement in which some components of the software engine are hosted on one or more cloud servers and other components are hosted on one or more client devices. As the software engines are virtualized, execution of tasks required by applications can be performed from one or more sources across the edge and the cloud depending on engine tasks and resources distribution rules. Thus, system resources such as memory, bandwidth, and computing resources are optimized and dynamically allocated across edge and cloud.

In an embodiment, the at least one distribution platform comprises one or more virtual cells linked to a plurality of physical network resource sources and configured to retrieve and allocate corresponding resources across edge and cloud to end-users. In some embodiments, the at least one distribution platform may use two or more virtual cells in combination in order to dynamically allocate resources and engine tasks to the one or more client devices.

In some embodiments, the computing optimization platform comprises computer programs enabling optimizations incorporating contextual data, 3D data structure, scene graphs, and preparation for rendering stages.

In an embodiment, contextual data includes data related to the direct or indirect environment of a user that has accessed the persistent virtual world system, which may be classified as "micro-context" and "macro-context". In an embodiment, the micro-context comprises user-related data and user interaction radius data. The user-related data comprises data related specifically to a user, for example, user location data; user viewing position and orientation; user social data; user preferences; user service context; or quality of service specific to the user, or a combination thereof. The user interaction radius data comprises data related to a predefined radius of interaction where a user may view and engage with virtual objects within the virtual-world system. Thus, the user interaction radius data comprises, for example, real world objects within the user interaction radius; virtual objects within the user interaction radius; or other users within the user interaction radius, or a combination thereof.

According to an embodiment, the macro-context relates to elements in a predefined area. The predefined area and thus, the macro-context, may be determined within the persistent virtual world system as a combination of micro-contexts in a specified geographical area. The macro-context may comprise data related to the number and location of network equipment such as servers and network antennas in a predetermined area; real world objects in the predetermined area; virtual objects in the predetermined area; the number of users in the predetermined area; and resource management for the predetermined area. In further embodiments, the macro-context further comprises holistic information of a system including current efficiency of a manufacturing plant, air quality, climate change levels, company efficiency, city efficiency, country efficiency, and worldwide efficiency.

The representation of spatial data is an important issue in the programming of the persistent virtual world system, involving the renderization and display of computer graphics, visualization, solid modeling, and related areas. Depending on the field of application of the persistent virtual world system and the characteristics and sources of the input data, different types of representations may be useful. The 3D data structure used to represent the persistent virtual world system and applications, ads, and other virtual objects therein contained, comprises, without limitations, one or more octrees, quadtrees, BSP trees, sparse voxel octrees, 3D arrays, kD trees, point clouds, wire-frames, boundary representations (B-Rep), constructive solid geometry trees (CSG Trees), bintrees, or hexagonal structures, or combinations thereof.

Optimizations through the 3D data structure in the current disclosure facilitate leveraging 3D real-time graphic techniques and spatial principles employed in high-end game and simulation engines. These techniques and principles help to optimize the exchanges of data and the distributed computing of applications and services through the network of computing resources connected to the server. The spatial principles are the spatial and temporal connections and constraints among phenomena happening on the extended reality. Physical phenomena (i.e., events taking place in the real world involving real world elements) are continuous data, while digital representations (i.e., the persistent virtual world system and the virtual replicas) are discrete for both space and time. Thus, closer things are more related to things that are farther away because correlations exist among parameters, time and space. Additionally, the multiscalar representations, from macro to micro-scales, are enabled.

Scene graphs are a data structure drawn schematically to arrange the logical and spatial representation of a graphical scene. Scene graphs are typically drawn with root nodes on top, and leave nodes at the bottom. In some embodiments, the root node may comprise the virtual world of the persistent virtual world system, which is then broken down into a hierarchy of nodes representing either spatial groupings of objects, settings of the position of objects, animations of objects, or definitions of logical relationships between objects (e.g., for managing the various states of a traffic light). Leaves of the scene graph represent the physical objects themselves, the drawable geometry and their material properties. In terms of performance, scene graphs provide a suitable framework for maximizing graphics performance.

Preparation for rendering stages may include any of several possible techniques utilized prior to performing computing rendering on a graphics scene, which may optimize the resource utilization and time employed during the actual rendering of the scene. For example, preparation for rendering stages may comprise techniques such as depth-culling, frustum culling, high-level occlusion culling, level-of-detail (LOD) algorithms, and preprocessing.

In some embodiments, other techniques can be used to further optimize computing, rendering and provisioning for users. For example, load balancing, which is the even distribution of processing and bandwidth across available resources such as servers and antennas in the network or disks in a storage area network (SAN), may use information from the macro-environment specific to the distance between user devices and network equipment, along with individual requirements per user, in order to balance network resources. Load balancing contributes to optimizing network bandwidth by dynamically allocating resources to assure optimized use of the network, minimizing network traffic. Another technique that may be used for such optimizations may be perspective switching, which comprises changing from a higher resource-consuming visual perspective of a graphics scene to a lower one in order to save resources. Other techniques may further include multi-threading, whereby the processor may execute multiple processes or threads concurrently while sharing resources of a single or multiple cores of the processor.

According to an embodiment, the sensing mechanisms mounted on the client devices include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements.

In some embodiments, tracking may be implemented by employing several techniques known in the art, such as time of arrival (TOA), angle of arrival (AOA), or other tracking techniques known in the art (e.g., GPS, visual imaging, radar technology, etc.). In alternative embodiments, the sensing mechanisms and transceivers may be coupled together in a single tracking module device. The sensing mechanisms of the client devices may also include one or more cameras. For example, the cameras may be depth-cameras installed in the client devices. The cameras may be configured to capture and provide the viewing position and orientation of the user which determines the viewing position and orientation of the virtual frames that are sent via the engine platform server.

According to an embodiment, a computer-implemented method enabling per-user-optimized computing of virtual worlds comprises the steps of providing in the memory of a server system comprising one or more server computers a persistent virtual world system comprising a data structure in which at least one virtual replica of at least one corresponding real object is represented, and a computing optimization platform configured to store and provide rules for optimizing the computing, rendering and data provisioning to users via one or more user devices; retrieving, by the server system, a user location, viewing position and orientation from the one or more user devices; determining a user interaction radius around the one or more user devices; and optimizing, via the computing optimization platform, the relevant computing, rendering and provisioning for the one or more user devices, wherein the optimizations are performed on a user interaction radius basis. In an embodiment, the method further comprises providing, by a plurality of connected devices comprising one or more user devices or other devices, multi-source data to the persistent virtual world system for updating the virtual replicas with corresponding real object data.

According to an embodiment, optimizing the relevant computing, rendering and provisioning for the one or more user devices by the computing optimization platform further comprises performing contextual data optimizations; performing 3D data structure optimizations; performing scene graphs optimizations; and preparing for rendering stages. According to an embodiment, preparing for rendering stages further comprises performing depth-culling, frustum culling, high-level occlusion culling, implementation level-of-detail (LOD) algorithms, and preprocessing.

According to an embodiment, provided herein are one or more non-transitory computer-readable media having stored thereon instructions configured to, when executed by one or more computers, cause the one or more computers to provide in the memory of a server a persistent virtual world system comprising a data structure in which at least one virtual replica of at least one corresponding real object is represented, and a computing optimization platform configured to store and provide rules for optimizing the computing, rendering and data provisioning to users via one or more user devices; provide, by a plurality of connected devices comprising one or more user devices or other devices, multi-source data to the persistent virtual world system for updating the virtual replicas with corresponding real object data; retrieve, by the server, a user location, viewing position and orientation from the one or more user devices; determine a user interaction radius around the one or more user devices; and optimize, via the computing optimization platform, the relevant computing, rendering and provisioning for the one or more user devices. More generally, computer-readable media storing executable instructions configured to cause one or more computing devices to perform any of the methods disclosed herein are contemplated.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
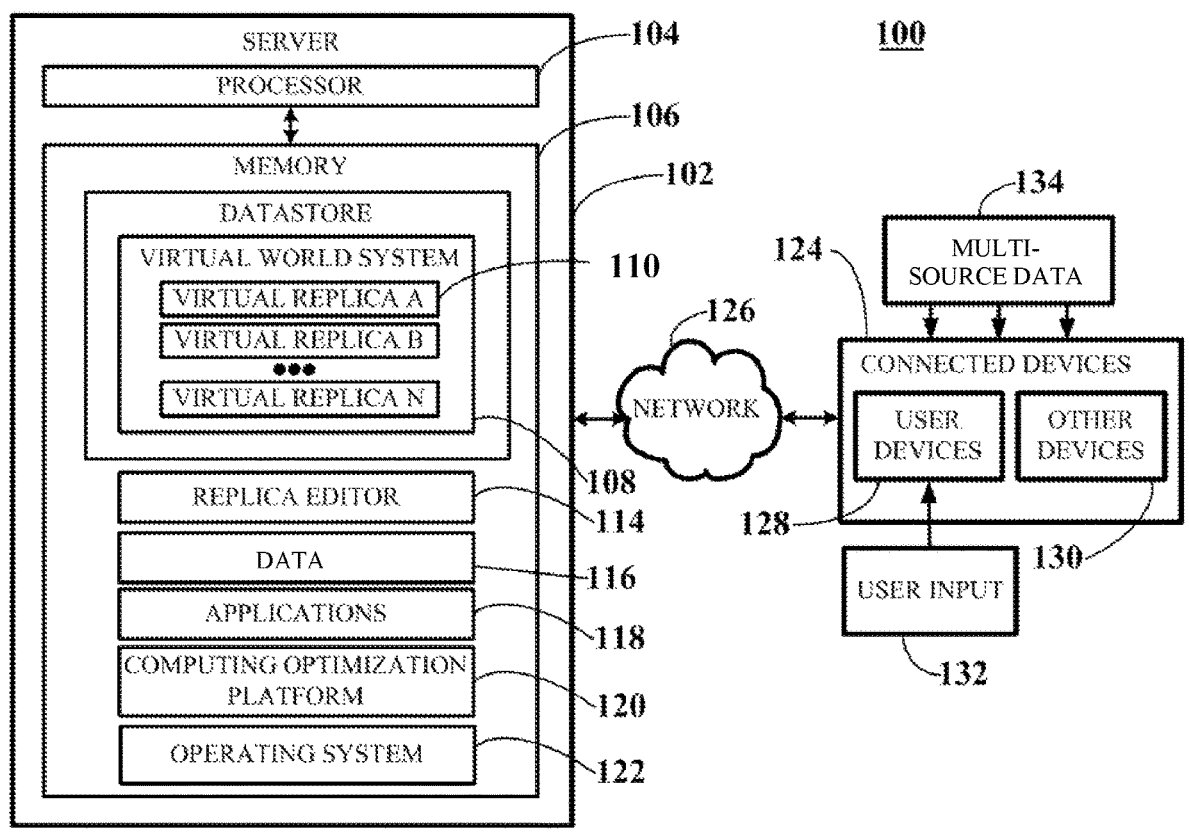
FIG. 1 depicts a schematic representation of a system enabling a per-user-optimized computing, rendering, and provisioning of data, according to an embodiment.

FIG. 1 depicts a schematic representation of a system 100 enabling per-user-optimized computing, rendering, and provisioning of data within virtual worlds.

A system 100 of the current disclosure comprises a server 102 configured to store and process input data, the server comprising at least one processor 104 and a memory 106. The at least processor 104 is configured to execute computer-implemented instructions stored in the memory 106. The memory 106 comprises a data store 108 with data a data structure in which at least one virtual replica 110 of at least one real world object is represented, forming a persistent virtual world system 112; a replica editor 114 configured to model and input data and instructions of each virtual replica 110; data 116 obtained via sensing mechanisms that serve to synchronize the real world objects with the virtual replicas 110; an application database 118 configured to store virtual objects such as applications, ads, and other interactive elements that are positioned within the persistent virtual world system 112; a computing optimization platform 120 configured to store and provide data and computer programs comprising rules for filtering the computing, rendering, and data provisioning to users; and an operating system 122 configured to manage computer hardware and software resources of the per-user-optimized computing system 100. Although some functions in examples disclosed herein as being performed by a single server (e.g., a server 102), it will be understood that functions described herein as being performed by a single server may instead be performed by multiple server computers, or vice versa.

The system 100 of the current disclosure may further comprise one or more fog servers comprising memory and at least one processor, the fog servers being located in areas proximate to connected devices 124 and configured to assist the servers 102 and connected devices 124 in the processing of the persistent virtual world system 112. Fog devices may include end-user devices, access points, edge routers, and switches, amongst others, spanning multiple management domains. Both server 102 and fog servers provide data, compute, storage, and application services to connected devices 124 that may enable servicing, distributing, computing, streaming and/or rendering digital content from the one or more elements in the persistent virtual world system 112, such as applications 118, virtual replicas 110, or purely virtual objects. The server 102 may refer to a cloud server, whereby functions and resources of a physical server are abstracted and distributed across one or more physical locations that can be accessed remotely. Using a cloud to edge computing network, access to computing power, computer infrastructure (e.g., through so-called infrastructure as a service, or IaaS), applications, and business processes can be delivered as a service to users via client devices on demand.

The memory 106 may be of any suitable type capable of storing information accessible by the processor 104, including a computer-readable medium, or other medium that stores data that may be read with the aid of an electronic device, such as a hard-drive, memory card, flash drive, ROM, RAM, DVD or other optical disks, as well as other write-capable and read-only memories. The memory may include temporary storage in addition to persistent storage. Instructions may be executed directly (e.g., machine code), or indirectly (e.g., scripts) by the processor 104. The instructions may be stored in object code format for direct processing by the processor 104, or in any other computer language including scripts or collections of independent source code modules that may be interpreted on demand or compiled in advance. Data may be retrieved, stored, or modified by the processor 104 in accordance with the instructions. Data may, for example, be stored in computer registers, in a relational database as a table having a plurality of different fields and records, XML documents, or flat files, amongst others. The data may also be formatted in any computer-readable format.

The processor 104 may refer to a single dedicated processor, a single shared processor, or a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), and field programmable gate array (FPGA), amongst others.

The system 100 further comprises a plurality of connected devices 124, which may be connected to the server via a network 126. The connected devices 124 may comprise user devices 128 and other devices 130. The user devices 128 may be used by users to send user input 132 to the server 102 for interacting with the virtual objects of the persistent virtual world system 112 and processing the user input 132 by the processor 104, in addition to capturing multi-source data 134 that may serve to update the virtual replicas 110. The user devices 128 may comprise, for example, mobile devices, personal computers, game consoles, media centers, head-mounted displays, and see-through devices (e.g., digital reality contact lenses). The other devices 130 may be configured specifically to capture multi-source data 134 from real world objects via sensing mechanisms in order to update and enrich the virtual replicas 110. According to an embodiment, the other devices 130 are one or more surveillance cameras, vehicles, traffic lights, buildings, streets, train-tracks, home appliances, or any other device that may be connected to a network 126.

Virtual replicas 110 may obtain data from one or more sources (e.g., from one or more real-world elements, environmental sensors, computing devices, etc.). As used herein, the term "multi-source" refers to data that may be obtained from multiple sources. Virtual replicas may be updated based on multi-source data, such as by updating known parameters or features, by enriching the virtual replicas with additional parameters or features, or the like. In the current disclosure, the term "enriching" is used to describe the act of providing further properties to a virtual replica 110 based on multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on the plurality of connected devices 124, wherein the further real-world data comprises video data, temperature data, real-time energy consumption data, real-time water consumption data, speed or acceleration data, or the like.

According to an embodiment, the multi-source data 134 comprises capturable data of each real world object, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others. The plurality of sensing mechanisms comprise one or more temperature sensors, proximity sensors, inertial sensors, infrared sensors, pollution sensors, pressure sensors, light sensors, ultrasonic sensors, smoke sensors, touch sensors, chromatic sensors, humidity sensors, water sensors, and electrical sensors, amongst others. Synchronizing the virtual replicas 110 with real world objects may enable not just to obtain an accurate position of each of the real world objects, but also enriches the virtual replicas 110 with data about the real-time functioning of the real world objects, which may be relevant in various situations, such as energy, water, and pollution management.

"Priority data", as used herein, refers to a hierarchical classification of real world objects. For example, certain vehicles (e.g., ambulances) or people (e.g., presidents, government officials, police officers, etc.) may have higher priorities which may affect the decisions performed based on data inference.

The term "instructions", as used herein, refers to code (e.g., binary code) that is configured to be executed by a processor. In the context of a virtual replica, instructions may refer to code that represents the behavior of the real world object. Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages.

"Real world objects" or "real world elements", as used in the current disclosure, refers to elements found in the real world which may be sensed by sensing mechanisms. For example, the real world objects may be moving or static entities found in the real world, including human beings, vehicles, buildings, objects, recreation areas, natural formations, and streets, amongst others.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a non-volatile storage location (e.g., in the server). In this way, virtual replicas, purely virtual objects and applications may interact and collaborate with each other when being configured for accomplishing specific goals even if users are not connected to the server.

The replica editor 114 is configured to input data and instructions of the virtual replicas 110 into the persistent virtual world system 112. The replica editor 114 may be, for example, a computer-aided drawing (CAD) software that may store data and instructions necessary to input and edit virtual replicas 110. The replica editor 114 may enable the input of data and instructions that relate to each digital replica, which describe the shape, location, position and orientation, physical properties, data structure, and the expected functioning and impact of each replica. Generally, data and instructions input through the replica editor 114 may include data that may not be obtained by the sensing mechanisms, such as priority data, building materials, wall thicknesses, electric installations and circuitry, water pipes, fire extinguishers, emergency exits, window locations, machine performance parameters, machine sensor and valve locations, etc. The data and instructions input through the replica editor 114 may include, apart from the shape and other properties of a real world element, descriptive data and instructions that represent the expected functioning and behavior of the real world element, including, for example, expected electricity and water consumption, expected flow of people in a building, and expected carbon footprint of a facility.

In the current disclosure, the term "impact" refers to the short or long-term effect of each virtual replica or to a group of virtual replicas to the macro-context. For example, one or more virtual replicas may have an effect in the overall efficiency of a manufacturing plant, in the air quality, climate change levels, company efficiency, resource consumption (e.g., water or electricity consumption), and the like. When developing virtual replicas of real world elements, virtual replica developers should define the properties and behavior of the virtual replicas in order to minimize negative impact to the environment, which may involve maximizing resource usage efficiency and ensuring process optimization of each virtual replica or group of virtual replicas. For example, when modeling one or more virtual replicas of manufacturing robots in a manufacturing plant, each virtual replica should be aware of a desired overall plant efficiency so that the production speed and resource consumption of each virtual replica in order to meet that goal. Another impact-related goal may be, for example, keeping the lowest carbon footprint possible, which can be achieved by optimizing the energy consumption during the production process of the virtual twins. The actions of the virtual replicas are thus translated in corresponding actions of the real twins, resulting in a real-world optimization and thus a minimized negative impact of each real twin.

Each virtual replica 110 may comprise data stores and models, where the data stores comprise properties of the virtual replicas, and the models are the graphical, mathematical and logical representations of any aspect of the real-world element represented by the virtual replica. The virtual replicas may include any type of model, including at least 3D, geometric, and dynamic models. 3D and geometry models allow the visualization of the virtual replicas 110 and to simulate collisions and interactions with other entities in the merged reality world. Dynamic models allow to simulate the behavior of the real world objects and may include continuous (e.g., algebraic or differential equations) and discrete (e.g., as state-machine or stochastic models) dynamics models. In other embodiments, virtual replicas can have also a machine learning model associated, so AI techniques may be used to optimize the operation and/or performance of the real world element through the corresponding virtual replica, which can facilitate computing optimizations by the computing optimization platform 120.

In some embodiments, a virtual replica 110 includes one or more of 3D world and building data, such as SLAM or derivate-mapping based data; 3D geometry data; 3D point cloud data; or geographic information system data representing real-world structural properties that may serve to model a 3D structure for digital reality applications.

Modeling tools comprised in the replica editor 114 are configured to enable building the virtual replicas 110. In some embodiments, the modeling tools include proprietary or third-party 3D game engines and/or simulation engine software development kits. Suitable examples of third-party 3D game engines are CryEngine, Unreal Engine, and Unity, amongst others. Suitable examples of third-party simulation engines include Mathworks, Simulink, Ansys Twin Builder, and Siemens Simcenter, amongst others. The game engines and/or simulation engines may be integrated in the replica editor through respective application programming interfaces (APIs) and software development kits (SDKs).

Modeling tools enable generating virtual replicas 110 with data and instructions based on readily-available CAD models of the real-world objects. For example, machine owners may provide an administrator of the persistent virtual world system 112 or may input by themselves the already-existing digital CAD models of their machines. Similarly, building owners may provide building information models (BIM) with building details to be stored in the persistent virtual world system 112, which may include information that may not be visible or easily obtainable via sensing mechanism. In other embodiments, the modeling tools enable a car or drone-based image-scanning pipeline to be input through a variety of photo, video, depth measurements, and/or simultaneous location and mapping (SLAM) scanning in order to model the virtual replicas 110. In other embodiments, radar-imaging, such as synthetic-aperture radars, real-aperture radars, Light Detection and Ranging (LIDAR), inverse aperture radars, monopulse radars, and other types of imaging techniques may be used to map and model real world objects before integrating them into the persistent virtual world system 112.

The persistent virtual world system 112 enables seamless and unlimited interactions between persistent virtual objects and the real world. The persistent virtual world system 112 may be viewed via the user devices 128 in virtual reality or augmented reality, which are connected to the real world via merged reality. Virtual reality represents a complete virtualization of the real world, including all virtual replicas 110 and other virtual objects, while augmented reality comprises both real and virtual elements, whereby some of the real elements are virtually augmented. The merged reality includes a virtual replica network (VRN) which enables the connectivity between the real and virtual world, keeping virtual replicas 110 of any real asset in the persistent virtual world system 112.

A direct one-to-one connection exists between every real-world/virtual-world pair, enabled through a bi-directional connection that keeps synchronized the data and models comprised in the virtual replicas 110. Every physical and virtual pair is identified with unique IDs and both are aware of the existence of their counterpart. In some embodiments, virtual replicas 110 can be associated with things or persons in the real world. In other embodiments, virtual objects that do not exist in the real world may also be integrated the persistent virtual world system 112. These can be persistent entities in the merged reality that interact without limitations with the other virtual replicas 110. For example, a fully virtual object without a counterpart may be a virtual prototype of a new building or a new model of a car, a virtual automated assistant (e.g., an artificial intelligence simulation used for applications as a virtual assistant), a virtual city's navigation assistant for an autonomous car, an AI character in a city-based AR game, ads and applications that may serve for marketing purposes, and the like.

The real-world/virtual-world pair may be considered to be a cyber-physical system (CPS), which is an integration of computation with physical processes whose behavior is defined by both cyber and physical parts of the system. Therefore, the virtual replicas 110 are the "cyber" part of a CPS. The virtual replicas 110 are then an extension of the real element that allows to connect the physical part with AI and simulations to improve its capabilities and performance. The virtual replica 110 may, in some embodiments, be a substitute of part of the physical components and processes. For example, in cases when a sensor is failing in the real counterpart, the sensing inputs for the real twin are provided by the interactions of the virtual replica in the virtual world. In another example, part of the computation for the real world element may be done in the virtual world if the battery is running low in the real world element.

Virtual replicas 110 can be aggregated in the same way that real things can be (e.g., an engine as part of a car). Thus, the persistent virtual world system 112 may replicate human to machine (H2M) communications, machine to machine (M2M) communications, or System of Systems (SoS) relationships as a VRN. In this way, two things can establish peer-to-peer (P2P) connections either through direct physical communications or through indirect VRN-based connections. For example, a specific traffic light in the city is linked to a road or street and can be associated also to other things as sensors or other traffic signals. These relationships can trigger events that can create new interactions in the platform. For example, an emergency car in a street can automatically trigger a priority event that will change the traffic lights pattern to avoid any stops in the intersections based on the simulation of the trajectory of the emergency car and the actual traffic conditions in the area.

In some embodiments, the one or more virtual objects comprising applications, ads, or other three-dimensional geometries and shapes stored in the application database 118 are developed via one or more local or third-party 3D engines.

In some embodiments, the computing optimization platform 120 is a computer module that stores rules and data that may determine how to filter and optimize the computing, rendering, and data provisioning to users, and may use contextual data in order to achieve this filtering and optimization.

The operating system 122 is configured to manage computer hardware and software resources of the per-user-optimized computing system 100. The operating system 122 may be any one of the following non-exhaustive list of operating systems: WINDOWS, UNIX, LINUX, iOS, ANDROID, and SYMBIAN, amongst others. Operating systems 122 may be a purpose-built operating system 122 based on one or more of the aforementioned operating systems 122.

The network 126 may comprise antennas configured to transmit and receive radio waves that enable mobile across edge and cloud. Antennas may be connected through wired or wireless means to computing centers. In other embodiments, the antennas are provided within the computing centers and/or areas near the computing centers. In some embodiments, in order to service user devices and/or real objects located outdoors, the antennas may include millimeter wave (mmW)-based antenna systems or a combination of mmW-based antennas and sub-6 GHz antenna systems, herein grouped as and referred to as 5G antennas. In other embodiments, the antennas may include other types of antennas, such as 4G antennas, or may be used as support antennas for the 5G antenna systems. In embodiments where antennas used for servicing real-time 3D-based interaction devices located indoors, the antennas may use Wi-Fi, preferably, but not limited to, providing data at 60 GHz.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments, each of the virtual replicas 110 of the persistent virtual world system 112 may be geolocated using a reference coordinate system suitable for use with current geolocation technologies. For example, the virtual replicas may use a World Geodetic System standard such as WGS 84, which is the current reference coordinate system used by GPS.

Figure 2:
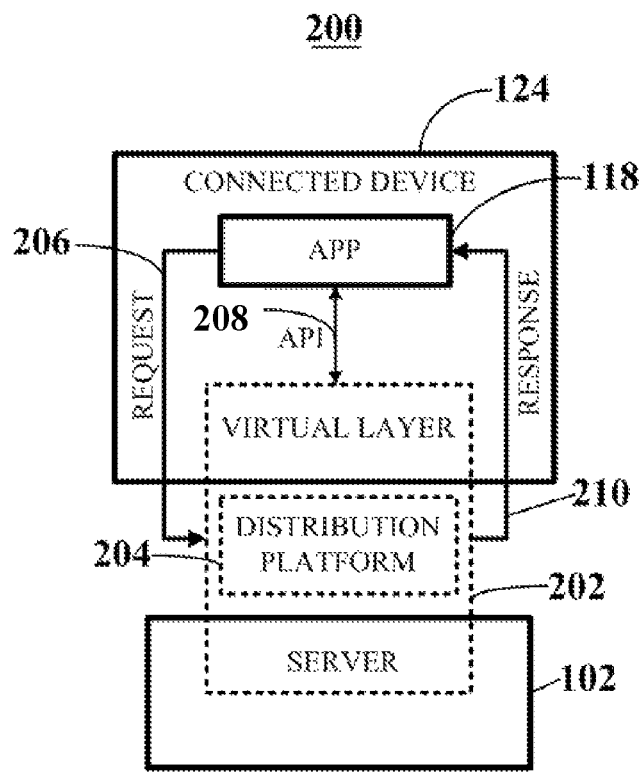
FIG. 2 depicts a schematic representation of a system detailing a virtual layer abstracting functions and resources between connected devices and servers, the virtual layer comprising a distribution platform.

FIG. 2 depicts a schematic representation of a system 200 detailing a virtual layer 202 abstracting functions and resources between connected devices and servers, the virtual layer comprising a distribution platform 204 configured to persistently distribute the relevant computing, rendering and provisioning across edge and cloud based on the computing optimization platform. The virtual layer 202 may further abstract functions across servers, fog servers and connected devices. Some elements of FIG. 2 may be similar to elements of FIG. 1, and thus similar or identical reference numerals may be used to depict those elements.

As the virtual layer 202 abstracts the network functions and resources available between the server 102 and connected devices 124, an application 118 may dynamically request 206 resources via a predefined interface, such as an application programming interface (API 208), and receive a response 210 via the API 208, from one or more of the connected devices 124 and server 102 through the virtual layer 202. The API 208 ensures that edge processing function and the cloud computing system can communicate with each other effectively and dynamically allocate resources and tasks.

Virtualization may be created by generating a virtualized or logical representation of all data center resources including, without limitations, hardware such as routers, switches, load balancers, WAN accelerators, firewalls, VPN concentrators, DNS/DHCP servers, workload/virtual machines, file systems, network attached storage systems, object storage, and backup storage, amongst others. By virtualizing resources, the physical location of the actual components may not be relevant when their services are requested by applications.

Figure 3A:
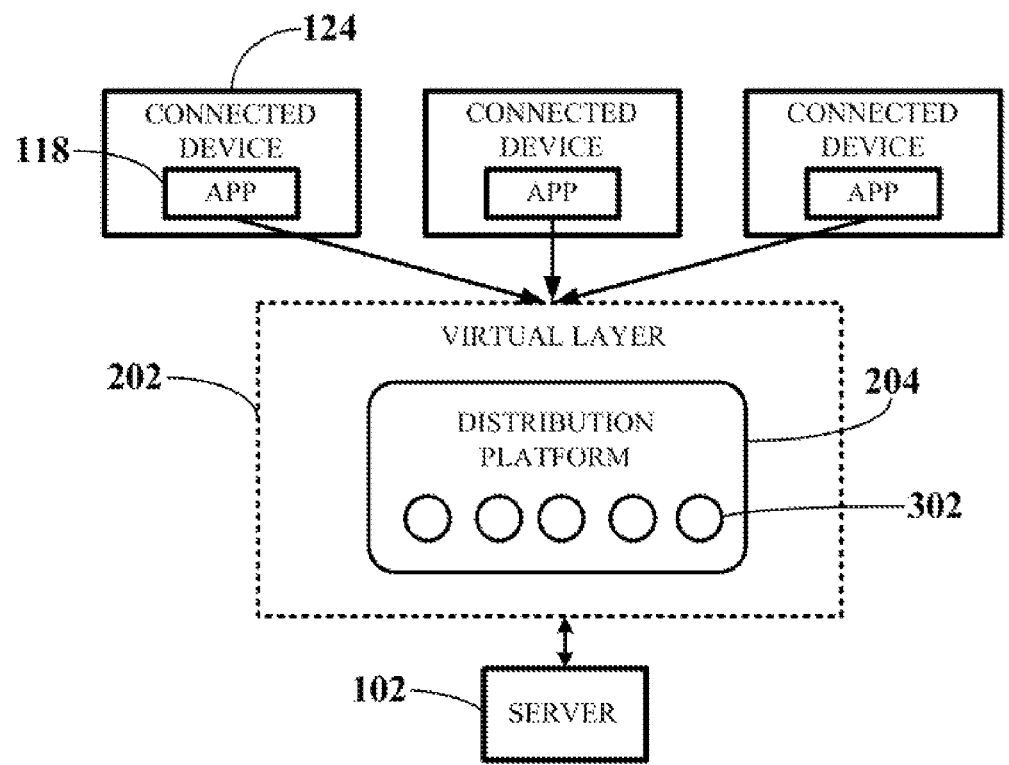
FIGS. 3A-3B depict sample embodiments of the functioning of a distribution platform in the virtual layer.
Figure 3B:
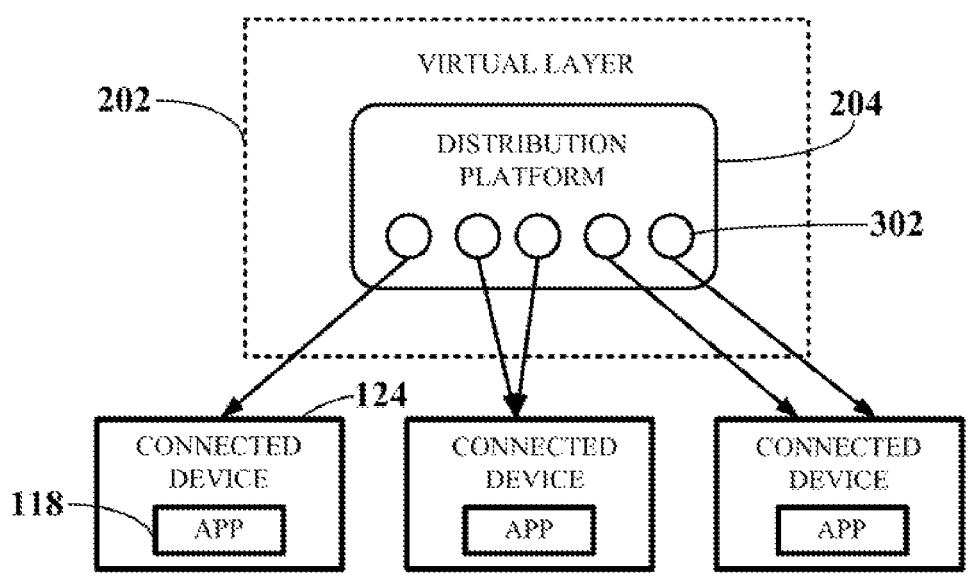

FIGS. 3A-3B depict sample embodiments of the functioning of the distribution platform 204 in the virtual layer 202. Some elements of FIGS. 2A-3B may be similar to elements of FIGS. 1-2, and thus similar or identical reference numerals may be used to depict those elements.

Making reference to FIG. 3A, the distribution platform 204 of the virtual engine 202 includes one or more virtual cells 302, or topics, linked to a plurality of physical network resources, the virtual cells 302 being configured to retrieve and allocate corresponding resources and engine tasks across edge and cloud to end-users. The distribution platform 204 may be, for example, a distributed message exchange service. The distribution platform 204 may be implemented in one or more several thousands of nodes, or virtual cell hosts, which may be virtually hosted in the virtual layer 202, and physically in one or more connected devices 124 or servers 102. A single instance of the distribution platform 204 may service anywhere from one to several millions of virtual cells 302. Furthermore, a plurality of service instances (e.g., thousands) may act on one or several million virtual cells 302. In some embodiments, two or more nodes may also be setup for replication, which can be helpful in dynamic load balancing.

In further embodiments, as viewed with reference to FIG. 3B, one or more virtual cells 302 may distribute resources to one or more connected devices 124, which may be especially useful for highly demanding applications.

The virtual cells 302 may additionally be assigned to locations in the real or virtual world, such that when a user requests services from a location, a virtual cell 302 may already be assigned to allocate resources from pre-determined sources to the location of the end-user. In some embodiments, the locations in the real or virtual world to which the virtual cells 302 may be assigned can be changed depending on optimization rules or as decided by a system administrator or designer.

The distribution platform 204 implements caching of states within each virtual cell 302. For example, the virtual cells 302 may cache all the applications 118, virtual objects, or real objects, and their states within the corresponding virtual cells 302. When a service subscribes to a certain virtual cell 302, the service first receives all the cached states and subsequently receives the updates until finishing the subscription to the topic.

The distribution platform 204 may follow a classic publish-subscribe paradigm, whereby the services may publish or subscribe to various virtual cells 302. The various services may be, for example, rendering, computing, simulating, and IoT updates. Thus, for example, a single connected device 124 may receive services from a plurality of sources, such as from a plurality of other connected devices 124 or servers 102.

Figure 4:
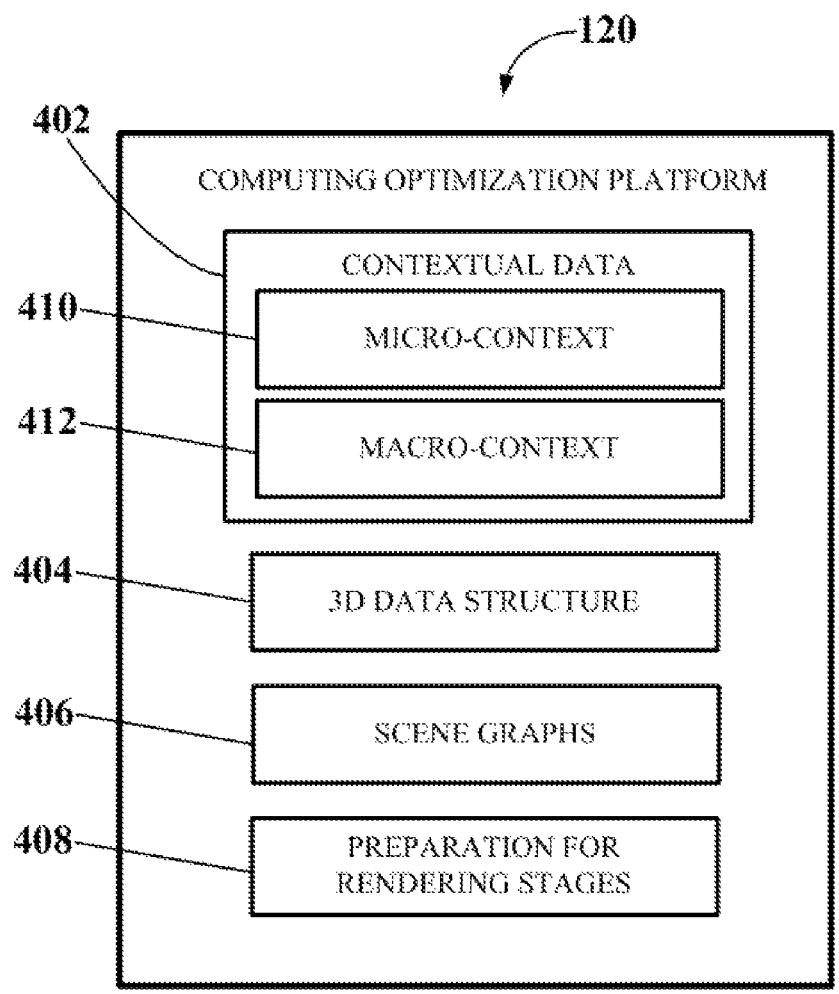
FIG. 4 depicts a schematic representation of a computing optimization platform for use in a system enabling per-user-optimized computing, rendering, and provisioning of data, according to an embodiment.

FIG. 4 depicts a schematic representation of a computing optimization platform 120 that may be used in a system enabling a per-user-optimized computing, rendering, and provisioning within virtual worlds, according to an embodiment. Some elements of FIG. 4 may be similar to elements of FIGS. 1-3B, and thus similar or identical reference numerals may be used to depict those elements.

The computing optimization platform 120 is configured to store and provide data and computer instructions with rules that, when implemented by a processor, filter the computing, rendering and data provisioning to users. According to an embodiment, the computing optimization platform 120 comprises computer programs incorporating contextual data 402, 3D data structure 404, scene graphs 406, and preparation for rendering stages 408.

The term "context" or "contextual data", as used in the current disclosure, may be classified as micro-context 410 and macro-context 412. In an embodiment, context refers to data related to the direct or indirect environment of an activated user device employed by a user that has accessed the persistent virtual world system. Calculation of aspects dealing with contextual data may be performed through machine learning techniques.

Particular data structures may be used to more effectively implement one or more aspects described herein, and such data structures are contemplated within the scope of computer executable instructions and computer-usable data of the current disclosure. In particular, the representation of spatial data is an important issue in the programming of the persistent virtual world system, involving the computing, renderization and display of computer graphics, visualization, solid modeling, and related areas, for which 3D data structures 404 may be especially useful. Depending on the field of application of the persistent virtual world system and the characteristics and sources of the input data, different types of representations may be employed. The 3D data structure 404 is used to represent the persistent virtual world system and applications, ads, and other virtual objects therein contained. The 3D data structure 404 serves the function of accurately and efficiently representing the data of each of the geometries of the virtual objects in the persistent virtual world system. The 3D data structure 404 allows, for example, a smoother interaction effect between virtual and real objects within the persistent virtual world system, facilitating a more accurate occlusion or collision effect between the objects. Examples of 3D data structures 404 comprise, without limitations, octrees, quadtrees, BSP trees, sparse voxel octrees, 3D arrays, kD trees, point clouds, wire-frames, boundary representations (B-Rep), constructive solid geometry trees (CSG Trees), bintrees, and hexagonal structures, amongst others.

A correct selection of the 3D data structure 404 depends on the origin of the data, the precision of geometries sought for during rendering; whether the rendering is done in real-time or pre-rendered; whether the rendering is performed via servers, via the user devices, or combinations thereof; the specific applications for which the persistent virtual world system is employed; and memory capacities from the servers and from the user devices and thus, amongst others.

For example, octrees represent a volume directly in the data structure. Their main advantages are a fast and easy combination of several objects; implementing a simple rendering; enabling performing quick spatial searches; and enabling a model generation through digitalization of real objects (e.g., LIDAR or other image scanning) On the other hand, disadvantages of octrees are that they present high storage demands for an accurate approximation of complex and curved objects; present hard-to-implement transformations; and do not allow general objects to be represented exactly. In another example, BSP trees display trivial transformations; fast rendering with correct occlusion; can be used to represent general objects; and enable model generation based on digitized objects. BSP trees, however, present disadvantages such as needing curved surfaces to be approximated; restricting only the usage of convex polygons; and presenting a high memory consumption, especially for curved and complex objects. In another example, B-reps represent all objects by their boundaries, and present advantages such as enabling easy transformations; enabling general representation of many objects; and allowing model generation to be based on digitized objects. B-reps, on the other hand, present a high memory consumption (especially for the accurate approximation of curved surfaces); combinations are costly; and curved faces have to be approximated. As will be appreciated by one of skill in the art, the disclosed 3D data structures 404 and other 3D data structures not disclosed may display more non-exhaustive advantages and disadvantages, and the selection of a correct 3D structure will depend on the necessary application of the persistent virtual world system and system requirements, amongst others.

Optimizations through the 3D data structure 404 in the current disclosure facilitate leveraging 3D realtime graphic techniques and spatial principles employed in high-end game and simulation engines. These techniques and principles help to optimize the exchanges of data and the distributed computing of applications and services through the network of computing resources connected to the server. The spatial principles are the spatial and temporal connections and constraints among phenomena happening on the extended reality. Physical phenomena (i.e., events taking place in the real world involving real world elements) are continuous data, while digital representations (i.e., the persistent virtual world system and the virtual replicas) are discrete for both space and time. Thus, closer things are more related to things that are farther away because correlations exist among parameters, time and space. Additionally, the multiscalar representations, from macro to microscales, are enabled.

Scene graphs 406 are a data structure typically drawn schematically with root nodes on top, and leave nodes at the bottom. In the current disclosure, the root node encompasses the virtual world of the persistent virtual world system and is then broken down into a hierarchy of nodes representing either spatial groupings of objects, settings of the position of objects, animations of objects, or definitions of logical relationships between objects such as those to manage the various states of a traffic light. Leaves of the scene graph 406 represent the physical objects themselves, the drawable geometry and their material properties. In terms of performance, scene graphs 406 provide an excellent framework for maximizing graphics performance Scene graphs 406 are also easily migrated from one platform to another, and also enable managing complex hardware configurations, such as clusters of graphics machines, or multiprocessors/multiple systems.

Preparation for rendering stages 408 may involve any of several techniques or combinations of techniques utilized prior to performing computing rendering on a graphics scene, which may optimize the resource utilization and time employed during the actual rendering of the scene. For example, preparation for rendering stages may comprise techniques such as depth-culling, frustum culling, high-level occlusion culling, level-of-detail (LOD) algorithms, and preprocessing.

LOD algorithms involve decreasing the complexity of a 3D model representation as the model moves away from the viewer, or according to other metrics such as object importance, viewpoint-relative speed, or position. LOD is a feature typically used in game engines to optimize real-time rendering, using more detailed models only where the point of view of the user is closer to the object. LOD management increases the efficiency of rendering by decreasing the workload on graphics pipeline usage, typically vertex transformations. The reduced visual quality of the model is often unnoticed because of the small effect on object appearance when the object is distant or moving at a fast speed. In general, LOD management may improve framerates and reduce memory usage. In this way, for example, different physical models can be associated to the virtual replicas, from low to high fidelity models, so that different simulations can be done depending on the case and situation. For example, a macro-simulation of the traffic in a city can be computed using low-fidelity models, but a micro-simulation using a high-fidelity model may be used to assist the autonomous driving of a vehicle.

Other optimization techniques may further be used, such as load balancing, which is the even distribution of processing and bandwidth across available resources such as servers and antennas in the network or disks in a storage area network (SAN). Load balancing may use information from the macro-context specific to the distance between connected devices and network equipment, along with individual requirements per user, in order to balance network resources. Load balancing contributes to optimizing network bandwidth by dynamically allocating resources to assure optimized use of the network, minimizing network traffic. Another suitable optimization technique may include perspective switching, which comprises changing from a higher resource-consuming visual perspective of a graphics scene to a lower one in order to save resources. For example, the computing optimization platform 120 may consider switching from a 3D perspective into a 2.5D or 2D perspective in order to reduce memory usage and increase overall computing and rendering efficiency. The term 2.5D comprises using 3D graphics restricted to two dimensions or otherwise fixed-perspective view. Other techniques may also include multithreading, whereby the processor may execute multiple processes or threads concurrently while sharing resources of a single or multiple cores of the processor.

The steps for rendering a 3D image are well-known in the art. However, with computing optimization techniques of the current disclosure, the rendering may result in a reduced use of computing resources and therefore a faster rendering. The stages used during rendering are responsible for processing information initially provided just as properties at end points (vertices) or control points of the geometric primitives (e.g., lines and triangles) used to describe the images to be rendered. The type of properties provided per vertex include x-y-z coordinates, RGB values, translucency, texture, reflectivity and other characteristics. A typical rendering pipeline may include, for example, steps such as receiving data comprising the 3D shapes and commands to render them; converting each vertex into a 2D screen position and applying lighting and vertex shaders to perform custom transformations for effects such as warping or deformations of a shape; clipping in order to disable rendering of objects when the objects are not currently seen by the camera because they are located outside a camera's view; applying primitive assembly, where vertices are collected and converted into triangles; applying rasterization; applying occlusion culling, which removes pixels that are occluded by other objects in a scene; applying parameter interpolation, where values for each pixel that were rasterized are computed, based on color, fog, texture, etc.; applying pixel shaders, which adds textures and final colors to the fragments and combine a pixel's attributes, such as color, depth and position on a screen, with textures in a user-defined way to generate custom shading effects; mathematically combining the final fragment colors, coverage and degree of transparency with the existing data stored at the associated 2D location in the frame buffer to produce the final color for the pixel to be stored at the location; and applying frame buffer controllers, which interface to the physical memory used to hold the actual pixel values displayed on screen. This results in 3D images that are adapted to a user's view.

Figure 5:
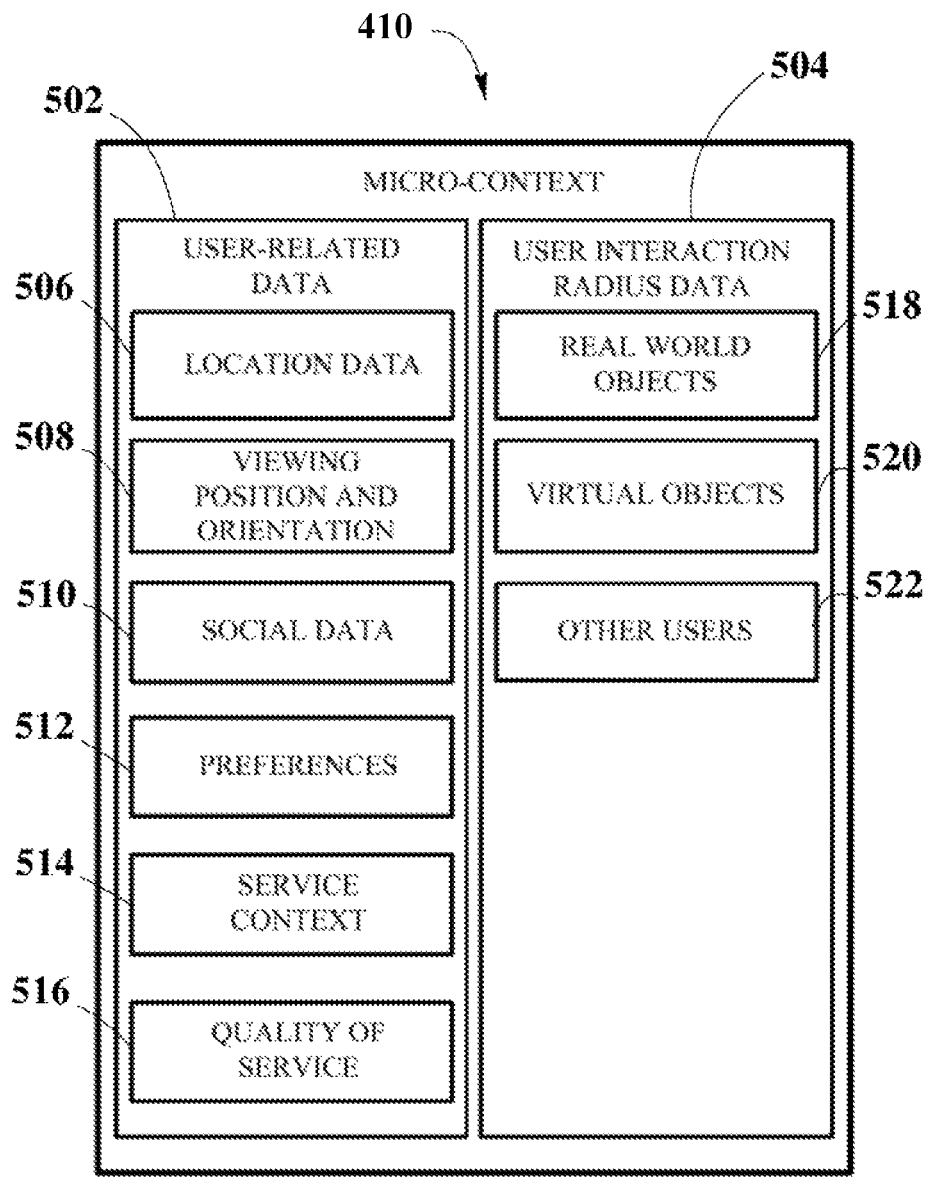
FIG. 5 depicts a schematic representation of a micro-context that may be used in a computing optimization platform of a system enabling per-user-optimized computing, rendering, and provisioning of data, according to an embodiment.

FIG. 5 depicts a schematic representation of a micro-context 410 used in the computing optimization platform, such as computing optimization platform 120 described with reference to FIG. 4, according to an embodiment. Some elements of FIG. 5 may be similar to elements of FIGS. 1-4, and thus similar or identical reference numerals may be used to depict those elements.

The micro-context 410 comprises user-related data 302 and user interaction radius data 504. The user-related data 302 comprises data related specifically to a user, for example, location data 506; viewing position and orientation 508; social data 510; preferences 512; service context 514; and quality of service 516 specific to the user. The user interaction radius data 504 may be related to a predefined radius of interaction where a user may view and engage with virtual objects within the virtual-world system. Thus, the user interaction radius data 504 comprises, for example, real world objects 518 within the user interaction radius, applications, ads, and other virtual objects 520 within the user interaction radius, as well as other users 522 within the user interaction radius.

The user location data 506 and viewing position and orientation 508 may be captured by sensing mechanisms within the user device and may be sent to the server.

The user social data 510 may refer to information regarding the relationship between users, which may enable several features. For example, users may use the persistent virtual world system as a social network where some users may befriend other users. If two users are friends within the social network and they are at a certain distance between each other (e.g., a distance where one user is visible to the other one), certain details, such as the name of the user, may be displayed somewhere near the user in order for the other user to recognize him Other features may include opening a communication channel, such as audiovisual or text, that may enable remote communication between users of the persistent virtual world system.

The user preferences 512 may be related to the type of application that the user may use more frequently, the type of social contacts that the user has, the type of places where the user tends to go, the type of items that the user tends to buy, the type of media content that the user tends to consume, the subjects that interest the user, etc. All of these data can be computed via methods known in the art, such as through artificial intelligence algorithms, and may be used to highlight to the user (e.g., through alert messages or sounds, or highlighting in shiny or more visible colors a specific place or a virtual object such as an application, ad, person, and the like) the content that may attract the user the most.

The service context 514 relates to the application that the actual applications being used by a user or users in the vicinity. As each application consumes bandwidth, service context may provide the server with valuable contextual data required to assess provisioning of network signals to each user device. The service context 514 also relates to whether a user is viewing the persistent virtual world system in augmented reality or virtual reality.

The quality of service 516 relates to the measurement of the overall performance of the network services being received by a user, such as cloud computing. Aspects of the services such as packet loss, bit rate, throughput, transmission delay, availability, and jitter, for example, may be used.

The real world objects 518 within the user interaction radius are elements found in the real world may be moving or static entities including human beings, vehicles, buildings, objects, recreation areas, natural formations, and streets, amongst others, which may affect the interaction between the real world objects 518 and virtual objects within the real world system and thus the data computing, rendering, and provisioning.

The virtual objects 520 within the user interaction radius are all applications, ads, purely virtual objects, and other elements that may be configured within the user interaction radius.

Data related to other users 522 within the user interaction radius may include the other users' service context and QOS, or social data of the other users, which may also affect the data computing and provisioning within the persistent virtual world system.

All of the data captured through the micro-context is used by the computing optimization platform to determine an adequate filtering and optimization of the computing, rendering, and data provisioning to users.

Figure 6:
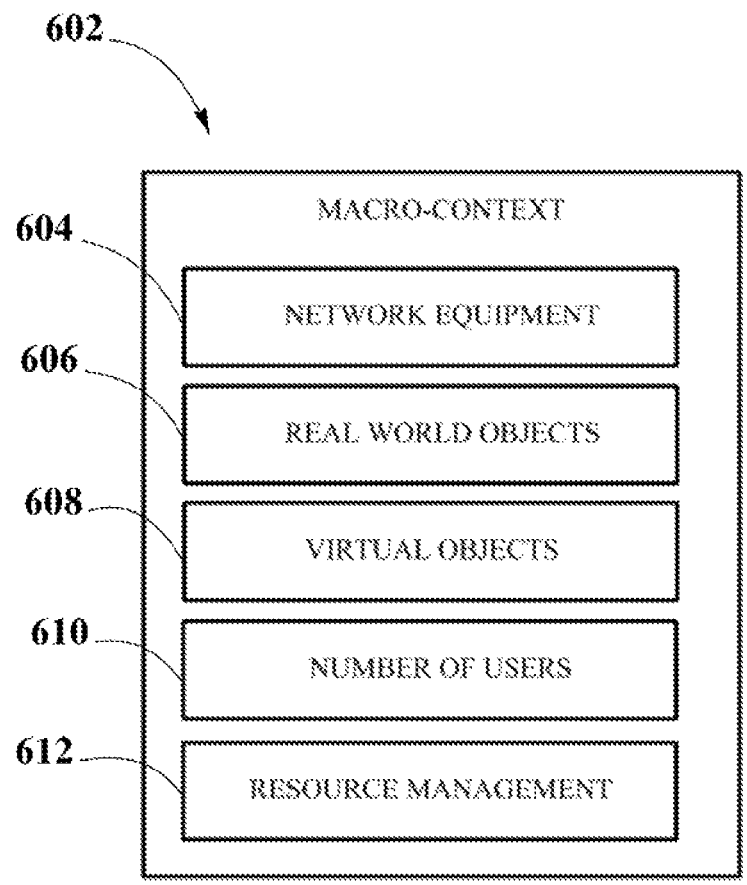
FIG. 6 depicts a schematic representation of a macro-context that may be used in a computing optimization platform of a system enabling per-user-optimized computing, rendering, and provisioning of data, according to an embodiment.

FIG. 6 depicts a schematic representation of a macro-context 602 used in the computing optimization platform, according to an embodiment.

The macro-context 602 comprises data related to elements in a predefined area. The predefined area may be determined within the persistent virtual world system as a combination of micro-contexts in a specified geographical area. The macro-context 602 may comprise comprises holistic information of a system including current efficiency of a manufacturing plant, air quality, climate change levels, company efficiency, city efficiency, country efficiency, and worldwide efficiency.

The macro-context 602 comprises, for example, network equipment 604 in a predefined area; real world objects 606 in the predefined area; virtual objects 608 in the predefined area; the number of users 610 in the predefined area; and resource management 612 for the predefined area. In further embodiments, the macro-context 602 comprises holistic information of a system including current efficiency of a manufacturing plant, air quality, climate change levels, company efficiency, city efficiency, country efficiency, and worldwide efficiency. The macro-context 602 may use the data of a plurality of micro-contexts in order to optimize the data computing, rendering, and provisioning to each user device while keeping the overall efficiency of the persistent virtual world system at suitable, predetermined levels. The macro-context 602 may be particularly used during load balancing 418 described with reference to FIG. 4.

The network equipment 604 within a predefined area may be characterized by the number and location of servers and network antennas in the area. The computing optimization platform of the server may calculate the distance between each user requiring network-data and the respective network antennas and data centers required for data provisioning, and may thereafter select the network antennas and data centers that can best provision the user with data.

The real world objects 606 are elements found in the real world may be moving or static entities found in the real world, including human beings, vehicles, buildings, objects, recreation areas, natural formations, and streets, amongst others, which may affect the interaction between the real world objects 606 and virtual objects within the real world system and thus the data computing, rendering, and provisioning. The virtual objects are all applications, ads, and other elements that may be configured within the predefined area.

The number of users 610 within the predefined area is also a factor when optimizing the data computing, rendering, and provisioning, as the number of users 610 may influence the quality of service in the system due to the bandwidth consumed per user device.

Resource management 612 refers to the management of resources, which may include resources such as energy, water, pollution, as well as computing resources such as network bandwidth. For example, if the persistent virtual world system is used to manage energy resources in a neighborhood, district, or city, the system may try to keep the energy efficiency as high as possible and may remind home owners to turn off unnecessary lights or artifacts. Some of this information may be displayed within the persistent virtual world system to users, having an effect in the data computing, rendering, and provisioning to users. Similar principles may apply to other types of resource management, where the system may modify a plurality of aspects within the persistent virtual world system in order to keep resource efficiency high, providing the corresponding real-time changes to users.

Figure 7:
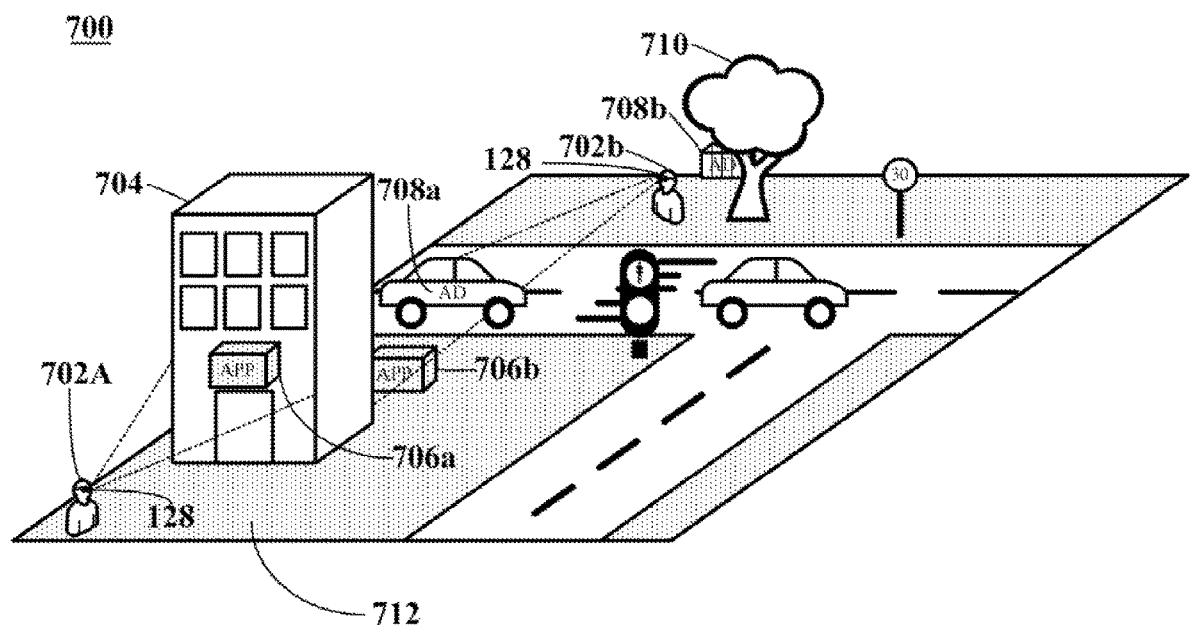
FIG. 7 depicts a schematic representation of a sample neighborhood scenario depicting real world objects and virtual objects in a system enabling per-user-optimized computing, rendering, and provisioning of data, according to an embodiment.

FIG. 7 depicts a schematic representation of a sample neighborhood scenario 700 depicting real world objects and virtual objects, according to an embodiment. Some elements of FIG. 7 may be similar to elements of FIGS. 1-6, and thus similar or identical reference numerals may be used to depict those elements.

Making reference to the example of FIG. 7, two users 702a-b wearing user devices 128 are looking in different directions with different fields of view comprising several real world objects and virtual objects.

User 702a, for example, may be able to view a building 704, and view and hear an application 706a, and may likewise be able to interact with the application 706a. However, because the 3D data structure of the building 704 is stored in the persistent virtual world system, application 706b, an ad 708a, and an ad 708b, may all be occluded or partially occluded by the building 704 and thus may not be visible or fully visible to user 702a. The user 702a may, on the other hand, hear any sounds emitted from application 706b, ad 708a, and, at a lower level, from ad 708b, alerting the user 702a of the presence of such virtual objects.

User 702b may be looking at an opposite direction than user 702a, and thus may be able to view and hear the ad 708a and the application 706b but, may only be able to hear any sounds emitted from the application 706*a* without being able to view it. Furthermore, user 702*b* may not be able to hear the ad 708*b* which may be partially occluded by a tree 710, but may be able to hear it louder than both the ad 708*a* and application 706*b*.

Figure 8:
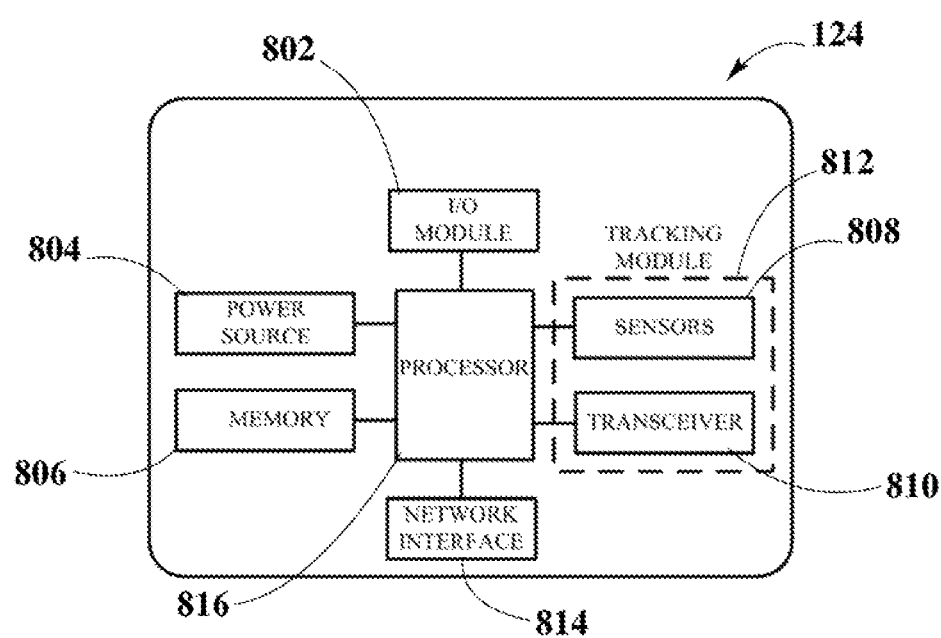
FIG. 8 depicts a schematic representation of a device that may be used in a system enabling per-user-optimized computing, rendering, and provisioning of data, according to an embodiment.

FIG. 8 depicts a schematic representation of a connected device 124 that may be used in a system 800 enabling a per-user-optimized computing, rendering, and provisioning within virtual worlds, according to an embodiment. Some elements of FIG. 8 may be similar to elements of FIGS. 1-7, and thus similar or identical reference numerals may be used to depict those elements.

A connected device 124 of the current disclosure may include operational components such as an input/output (I/O) module 802; a power source 804; a memory 806; sensing mechanisms 808 and transceivers 810 forming a tracking module 812; and a network interface 814, all operatively connected to a processor 816.

The I/O module 802 is implemented as computing hardware and software configured to interact with users and provide user input data to one or more other system components. For example, I/O module 802 may be configured to interact with users, generate user input data based on the interaction, and provide the user input data to the processor 816 before being transferred to other processing systems via a network, such as to a server. In another example, I/O modules 802 is implemented as an external computing pointing device (e.g., a touch screen, mouse, 3D control, joystick, gamepad, and the like) and/or text entry device (e.g., a keyboard, dictation tool, and the like) configured to interact with connected device 124. In yet other embodiments, I/O module 802 may provide additional, fewer, or different functionality to that described above.

The power source 804 is implemented as computing hardware and software configured to provide power to the connected device 124. In one embodiment, the power source 804 may be a battery. The power source 804 may be built into the connected device 124 or removable from the connected device 124, and may be rechargeable or non-rechargeable. In one embodiment, the connected device 124 may be repowered by replacing one power source 804 with another power source 804. In another embodiment, the power source 804 may be recharged by a cable attached to a charging source, such as a universal serial bus ("USB") FireWire, Ethernet, Thunderbolt, or headphone cable, attached to a personal computer. In yet another embodiment, the power source 804 may be recharged by inductive charging, wherein an electromagnetic field is used to transfer energy from an inductive charger to the power source 804 when the two are brought in close proximity, but need not be plugged into one another via a cable. In another embodiment, a docking station may be used to facilitate charging.

The memory 806 may be implemented as computing hardware and software adapted to store application program instructions and to store data captured by the plurality of sensing mechanisms 808. The memory 806 may be of any suitable type capable of storing information accessible by the processor 816, including a computer-readable medium, or other medium that stores data that may be read with the aid of an electronic device, such as a hard-drive, memory card, flash drive, ROM, RAM, DVD or other optical disks, as well as other write-capable and read-only memories. The memory 806 may include temporary storage in addition to persistent storage.

The sensing mechanisms 808 may be implemented as computing hardware and software adapted to obtain various data from the real world and determine/track the position and orientation of the connected device 124. The sensing mechanisms 808 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 808 include one or more Inertia Measuring Units (IMUs), accelerometers, and gyroscopes. The IMU is configured to measure and report the velocity, acceleration, angular momentum, speed of translation, speed of rotation, and other telemetry metadata of connected device 124 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 810 may be implemented as computing hardware and software configured to enable connected device 124 to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 810 may be a two-way communication transceiver 810.

In an embodiment, the tracking module 812 may be implemented by combining the capabilities of the IMU, accelerometers, and gyroscopes with the positional tracking provided by the transceivers 810 and the accurate tracking, low-latency and high QOS functionalities provided by mmW-based antennas may enable sub-centimeter or sub-millimeter positional and orientational tracking, which may increase accuracy when tracking the real-time position and orientation of connected device 124. In alternative embodiments, the sensing mechanisms 808 and transceivers 810 may be coupled together in a single tracking module device.

The network interface 814 may be implemented as computing software and hardware to communicatively connect to a network, receive computer readable program instructions from the network sent by the server or by connected device 124, and forward the computer readable program instructions for storage in the memory 806 for execution by the processor 816.

The processor 816 may be implemented as computing hardware and software configured to receive and process data. For example, the processor 816 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 816 may receive user input data from I/O module 802 and may respectively implement application programs stored in the memory 806. In other examples, the processor 816 may receive data from sensing mechanisms 808 captured from the real world, or may receive an accurate position and orientation of connected device 124 through the tracking module 812, and may prepare some of the data before sending the data to a server for further processing. As way of example, the processor 816 may realize some of the steps required during data preparation including analog or digital signal processing algorithms such as raw data reduction or filtering of data before sending the data to a server.

Figure 9:
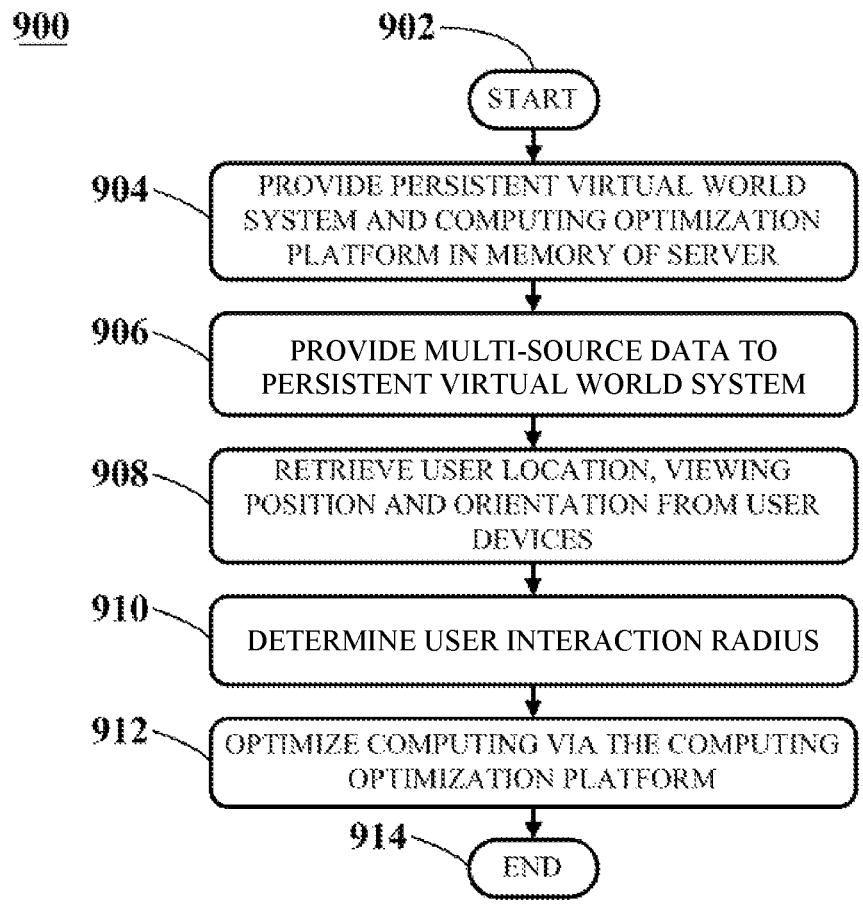
FIG. 9 depicts a block diagram of a method enabling per-user-optimized computing, rendering, and provisioning of data, according to an embodiment.

FIG. 9 depicts a block diagram of a method 900 enabling a per-user-optimized computing, rendering, and provisioning within virtual worlds, according to an embodiment. Method 900 may be implemented in a system such as systems described with reference to FIGS. 1-8.

Method 900 begins in steps 902 and 904 providing in the memory of a server a persistent virtual world system comprising a data structure in which at least one virtual replica of at least one corresponding real object is represented, and a computing optimization platform configured to store and provide rules for optimizing the computing, rendering and data provisioning to users via one or more user devices. The method 900 continues in step 906 by providing, by a plurality of connected devices comprising one or more user devices or other devices, multi-source data to the persistent virtual world system for updating the virtual replicas with corresponding real object data.

In step 908, the method 900 proceeds by retrieving, by the server, a user location, viewing position and orientation from the one or more user devices. Then, in step 910, the method 900 continues by determining a user interaction radius around the one or more user devices. Finally, the method 900 ends by optimizing, via the computing optimization platform, the relevant computing, rendering and provisioning for the one or more user devices, wherein the optimizations are performed on a user interaction radius basis.

According to an embodiment, optimizing the relevant computing, rendering and provisioning for the one or more user devices by the computing optimization platform further comprises performing contextual data optimizations; performing 3D data structure optimizations; performing scene graphs optimizations; and preparing for rendering stages.

According to an embodiment, preparing for rendering stages further comprises performing depth-culling, frustum culling, high-level occlusion culling, implementation level-of-detail (LOD) algorithms, and preprocessing.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A system enabling computing, rendering, and provisioning within virtual worlds, the system comprising:
a server system comprising a server computer, the server computer comprising memory and a processor, the server system storing a persistent virtual world system comprising a data structure in which a virtual replica of a corresponding real object is represented, a replica editor configured to model and edit the virtual replica, a computing optimization platform configured to store and provide rules for optimizing computing, rendering and data provisioning for the virtual replica of the persistent virtual world system to a user via a user device, and a distribution platform,
wherein the virtual replica is configured to be updated in response to receiving real-world data from a sensing mechanism about the physical condition or physical environment of the corresponding real object,
wherein the server system optimizes via the computing optimization platform, the computing, rendering and provisioning for the virtual replica for the user device,
wherein the optimizing is performed based on contextual data including micro-contexts and a macro-context,
wherein the micro-contexts comprise user-related data and user interaction radius data,
wherein the macro-context includes location of real-world network equipment and real-world objects in a predefined area and micro contexts for optimizing the virtual replica for the user device, and
wherein the distribution platform is configured to distribute the computing, rendering, and provisioning across edge and cloud based on rules provided by the computing optimization platform.

2. The system of claim 1, further comprising a plurality of devices configured to capture multi-source data that serves to update the virtual replica, and a fog server comprising memory and at least one processor, the fog server being located in an area proximate to the devices and configured to assist the server system and the devices in the processing of the persistent virtual world system.

3. The system of claim 2, further comprising a virtual layer abstracting functions between the devices, the server system and the one or more fog servers, the virtual layer comprising the distribution platform.

4. The system of claim 3, wherein the distribution platform comprises virtual cells configured to be linked with a plurality of physical network resource sources, and wherein two or more virtual cells are configured to be used in combination in order to dynamically allocate resources and engine tasks to the user device as part of the provisioning to the user device.

5. The system of claim 1, wherein the server system further stores data from the real world captured by sensing mechanisms on the devices; and an operating system configured to manage computer hardware and software resources for performing per-user-optimized computing, rendering and provisioning.

6. The system of claim 1, wherein the optimizing is performed by the optimization platform on application data of applications positioned in the persistent virtual world system based on interactions with the user, virtual replicas, other applications or virtual objects of the persistent virtual world system.

7. The system of claim 1, wherein the optimizing is further based on a three dimensional data structure, scene graphs, and preparation for rendering stages.

8. The system of claim 7, wherein the three-dimensional data structure comprises one or more octrees, quadtrees, BSP trees, sparse voxel octrees, three-dimensional arrays, kD trees, point clouds, wire-frames, boundary representations, constructive solid geometry trees, bintrees, or hexagonal structures, or combinations thereof.

9. The system of claim 1, wherein the server system retrieves user location, viewing position, and orientation from the user device to determine a user interaction radius.

10. The system of claim 1, wherein the user-related data comprises user location data, user viewing position and orientation, user social data, user preferences, user service context, or quality of service specific to the user, or a combination thereof, and wherein the user interaction radius data comprises real world objects, virtual objects, or other users within the user interaction radius, or a combination thereof.

11. A method enabling per-user-optimized computing of virtual worlds, the method comprising:

providing in memory of a server system comprising a server computer a persistent virtual world system comprising a data structure in which a virtual replica of a corresponding real object is represented, a replica editor configured to model and edit the virtual replica, a computing optimization platform configured to store and provide rules for optimizing computing, rendering and data provisioning for the virtual replica of the persistent virtual world system to a user via a user device, and a distribution platform, wherein the virtual replica is configured to be updated in response to receiving real-world data from a sensing mechanisms about the physical condition or physical environment of the corresponding real object;

optimizing, via the computing optimization platform, the computing, rendering and provisioning for the at least one virtual replica for the user device, wherein the optimizing is performed based on contextual data including micro-contexts and a macro-context, wherein the micro-contexts comprise user-related data and user interaction radius data, wherein the macro-context includes location of real-world network equipment and real-world objects a predefined area, and micro contexts for optimizing the virtual replica for the user device, and wherein the distribution platform is configured to distribute the computing, rendering, and provisioning across edge and cloud based on the rules provided by the computing optimization platform.

12. The method of claim 11, further comprising providing one or more fog servers comprising memory and a processor, the fog servers being located in areas proximate to devices and configured to assist the server system and the devices in the processing of the persistent virtual world system.

13. The method of claim 12, further comprising providing a virtual layer abstracting functions between the devices, the server system and the one or more fog servers, the virtual layer comprising the distribution platform.

14. The method of claim 13, wherein the at least one distribution platform comprises virtual cells configured to be linked with a plurality of physical network resource sources, and wherein two or more virtual cells are configured to be used in combination in order to dynamically allocate resources and engine tasks to the user device as part of the provisioning to the user device.

15. The method of claim 11 further comprising providing in the server system data from the real world captured by sensing mechanisms on the devices;

and an operating system configured to manage computer hardware and software resources for performing per-user-optimized computing, rendering and provisioning.

16. The method of claim 11, wherein the optimizing is performed by the optimization platform on application data of applications positioned in the persistent virtual world system based on interactions with users, virtual replicas, other applications or virtual objects of the persistent virtual world system.

17. The method of claim 11, wherein the optimizing comprises:

performing three-dimensional data structure optimizations;

performing scene graphs optimizations; and preparing for rendering stages.

18. The method of claim 11, further comprising, retrieving, via the server system, user location, viewing position, and orientation from the user device to determine a user interaction radius.

19. The method of claim 17, wherein preparing for the rendering stages comprises performing depth-culling, frustum culling, high-level occlusion culling, or implementation level-of-detail (LOD) algorithms, or a combination thereof.

20. One or more non-transitory computer-readable media having stored thereon instructions configured to, when executed by one or more computers, cause the one or more computers to:

provide in memory of a server system comprising a server computer a persistent virtual world system comprising a data structure in which a virtual replica of a corresponding real object is represented, a replica editor configured to model and edit the virtual replica, a computing optimization platform configured to store and provide rules for optimizing computing, rendering and data provisioning for the virtual replica of the persistent virtual world system to a user via a user device, wherein the virtual replica is configured to be updated in response to receiving real-world data from a sensing mechanisms about the physical condition or physical environment of the a corresponding real object;

optimize, via the computing optimization platform, the computing, rendering and provisioning for the virtual replica for the user device, wherein the optimizing is performed based on contextual data including micro-contexts and a macro-context, wherein the micro-contexts comprise user-related data and user interaction radius data, wherein the macro-context includes location of real-world network equipment and real-world objects in a predefined area, and micro contexts for optimizing the virtual replica for the user device, and, wherein the distribution platform is configured to distribute the computing, rendering, and provisioning across the edge and cloud based on rules provided by the computing optimization platform.

* * * * *